United States Patent [19]

Suzuki

[11] Patent Number: 5,097,458
[45] Date of Patent: Mar. 17, 1992

[54] SERVO CONTROL SYSTEM FOR OPTICAL DISK DEVICE

[75] Inventor: Haruyuki Suzuki, Kawasaki, Japan

[73] Assignee: Ricoh Company, Ltd., Tokyo, Japan

[21] Appl. No.: 526,606

[22] Filed: May 22, 1990

[30] Foreign Application Priority Data

May 29, 1989 [JP] Japan ................................. 1-135182
Jun. 27, 1989 [JP] Japan ................................. 1-164544

[51] Int. Cl.⁵ ............................. G11B 7/09; G11B 7/00
[52] U.S. Cl. ............................. 369/44.34; 369/44.24; 369/44.35; 369/44.27
[58] Field of Search ............... 369/44.34, 44.29, 44.27, 369/44.31, 44.35, 44.36, 44.11, 44.26; 250/201.2, 201.4

[56] References Cited

U.S. PATENT DOCUMENTS

| | | | |
|---|---|---|---|
| 4,707,648 | 11/1987 | Minami | 369/44.34 |
| 4,775,966 | 10/1988 | Miura et al. | 369/44.34 |
| 4,918,676 | 4/1990 | Miyasaka | 369/44.28 |
| 4,918,680 | 4/1990 | Miyasaka | 369/44.34 |
| 5,003,524 | 3/1991 | Ikeda | 369/44.28 |

FOREIGN PATENT DOCUMENTS 0349439 1/1990 European Pat. Off. ......... 369/44.34

Primary Examiner—Roy N. Envall, Jr.
Assistant Examiner—Thang V. Tran
Attorney, Agent, or Firm—Cooper & Dunham

[57] ABSTRACT

A servo control system for an optical disk device which comprises a unit for scanning an optical disk by an optical spot converged and irradiated on the disk; a unit for feed back controlling position of the optical spot in a focussing direction; and a unit for feed back controlling position of the optical spot in a tracking direction. The system further comprises: a first and second optical detectors, each being divided to at least two detection areas; a multiplexer to which the detection areas are connected for time sharing the detection signals; an adder for adding up the detection signals output from one of the detectors; an A/D converter which converts the time shared signal output from the multiplexer to a digital signal using the added up signal as a reference thereof; and a logic circuit which is connected to the A/D converter and calculates from the digital signal output from the A/D converter to obtain digital error signals of focus and track.

9 Claims, 5 Drawing Sheets

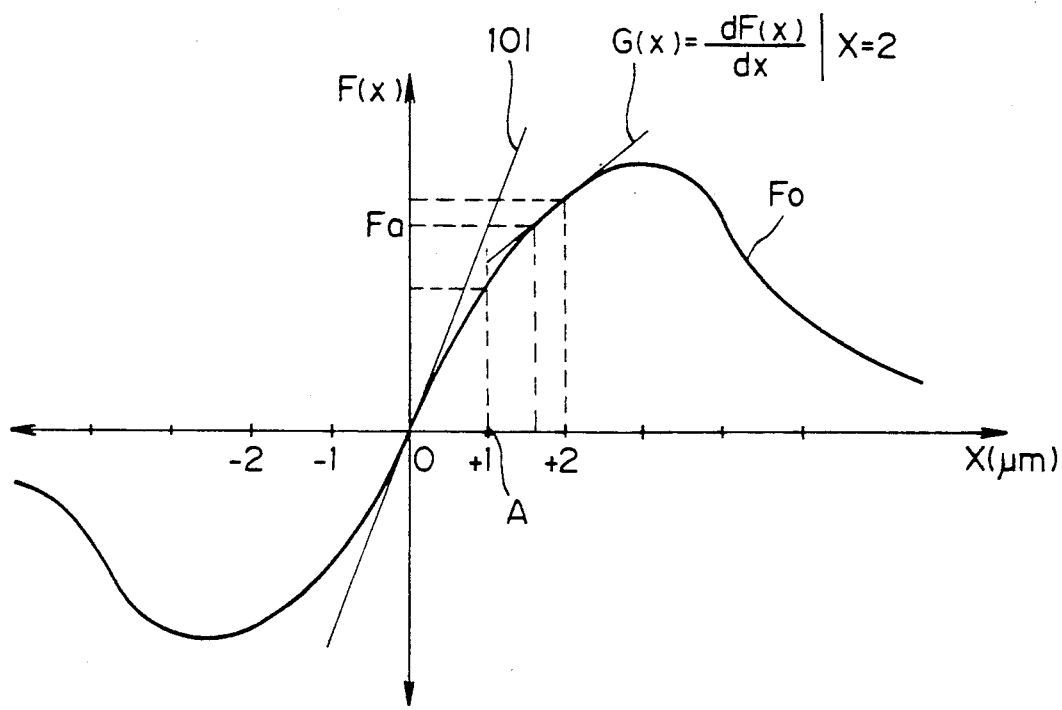

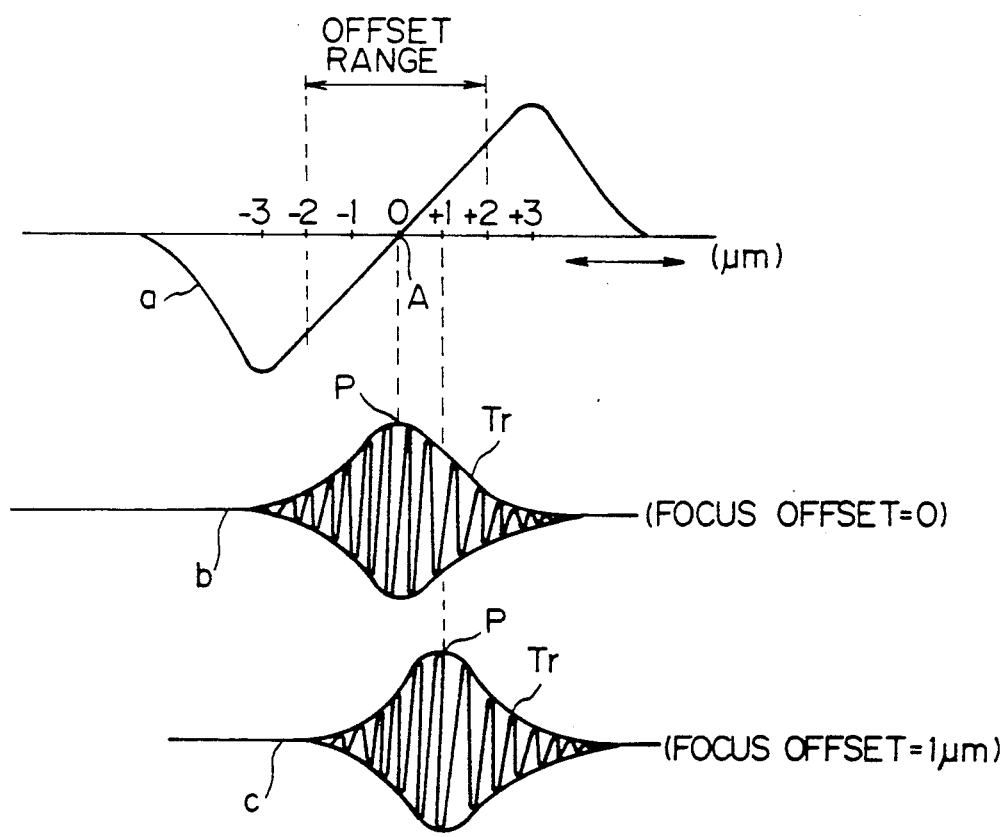

SERVO CONTROL SYSTEM FOR OPTICAL DISK DEVICE

BACKGROUND OF THE INVENTION

1. Field of the Invention

The present invention relates to a servo control system for an optical disk device.

The present invention further relates to a focus offset correction circuit of an optical pickup device.

2. Description of the Related Art

In general, with respect to an optical disk device, it is important to converge the optical scanning beam to irradiate an optical disk surface in a state that the spot of the beam is focussed on a track of the disk. For this purpose, the focussed point of the beam is always controlled by a focussing/tracking servo control system.

An example of such a servo control system is disclosed in the papers of Optical Memory Symposium, Sept. 21, 1988, page 77 to 78, titled "Digitization of Servo System for Optical Disk". This is aiming to realize a digitized intelligent servo system which constitutes a control system of the optical disk device.

With regard to one of the servo systems, for example, a focussing servo system, the construction and function of the system are as follows.

First, the reflection rays reflected from the optical disk are received by a photoelectric detector and converted to electric signals. The detector is divided to at least two detection portions. The outputs from the two detection portions are passed through a low pass filter, respectively, and input to an adder which adds the two output signals to form an added up signal. Also, the two output signals from the two detection portions are input to a subtracter after passing through the respective low pass filters. The subtracter subtracts one of the signals from the other to form a difference signal corresponding to the difference between the two signals. The difference signal is used as a focus error signal which corresponds to the amount of dislocation of the object to be controlled from a desired set point. In this case, in order to maintain the gain of the error signal constant irrespective of the change or fluctuation of the optical amount of the reflection rays from the optical disk, the difference signal is converted to a digital signal by an A/D converter using the added up signal from the adder as the reference input signal. Thereby, the difference signal is always normalized by the added up signal corresponding to the optical amount of the reflection rays, which makes it possible to perform an AGC (Automatic Gain Control) function.

The error signal which was digitized by the A/D converter is introduced to a logic circuit which is controlled by a CPU. After that, the error signal is again converted to an analogue signal by a D/A converter. The analogue signal output from the D/A converter is input to a focus servo control circuit which comprises a phase correction circuit and an objective lens driving circuit, so that a servo control loop is formed.

In the above mentioned structure, it is necessary to correct the offset of the error signal which offset means that the desired set point is shifted and dislocated from a reference point of the servo system caused by dimensional errors of the optical system or change of the ambient temperature. For this purpose, a corrective analogue signal derived from another D/A converter which is controlled by the CPU is added to the error signal by another adder so as to cancel the offset of the error signal.

It is to be noted that the low-pass filters function to minimize the noise generated and transmitted backward from the A/D converter at the time of sampling the signals.

Also, the logic circuit functions to generate a timing signal for stopping the servo operation and an error discrimination signal.

The above mentioned circuit structure has to be prepared for every control system. For example, a focus control system comprises one special control circuit having the above mentioned structure for its own. Therefore, with regard to the focus/tracking control system, it is necessary to prepare another similar circuit for the tracking control system in addition to that for the focus control system, which makes the control system large and complicated as a whole.

Besides, the above mentioned circuit structure has a problem as follows.

In general, an A/D converter quantizes the potential difference between a positive reference input signal (RT) and a negative reference input signal (RB) to $2^n$ amount units wherein "n" designates the number of bits so as to digitize the input voltage of the corresponding signal.

On the other hand, the servo error signal has a voltage of predetermined value (for example, zero) when the signal is coincident with the servo set point (desired point), that is when the beam spot is in focus on the desired track, for example. Also, when the signal value becomes discordant from the set point, the voltage of the signal becomes positive or negative according to the plus side or minus side of the signal with respect to the set point.

Therefore, when the error signal is to be converted to a digital signal by an A/D converter, the set point of voltage is arranged as a center point of the positive reference voltage (RT) and the negative reference voltage (RB), that is, a point of $(RT+RB)/2$ so as to obtain a sufficient dynamic range. In this case, in order to perform a reliable AGC operation, when the added up signal is input as the references (RT) and (RB), it is necessary to prevent the set point $(RT+RB)/2$ from being shifted and dislocated from the central point of the voltage along with the change of the references (RT) and (RB). Therefore, it is necessary to symmetrically change the references (RT) and (RB) with respect to each other relative to the central set point $(RT+RB)/2$. In other words, when a positive signal is input to the reference (RT), a negative signal of the same value has to be input to the reference (RB). For this purpose, an inversion amplifier of gain 1 is used to generate the signal having an inverted polarization. In this case, if the inversion amplifier has an offset or a gain error, the references (RT) and (RB) do not change symmetrically, which results in that the central set point of voltage for servo control of the error signal changes. It is possible to avoid such a problem by properly adjusting and correcting the offset and the gain of the amplifier. However, it is troublesome and costly to adjust and correct the amplifier.

In an optical pickup device, a laser beam which is converged by an objective lens is irradiated to an optical disk (or photomagnetic disk). In this case, it is necessary to adjust the position of the objective lens to focus the beam spot on the disk surface. Such an adjustment of the position of the objective lens in the focussing direction is carried out by a focus servo control circuit in response to the focus error signal.

Most desirably, when the focus error signal is zero, the beam is focussed on the disk surface so that the beam spot diameter is minimized thereon and that the amplitude of the track error signal (or information signal) which is used for tracking servo control is maximized.

However, in actual cases, the maximum point of the track error signal does not necessarily coincide with the zero point of the focus error signal due to the constructional errors of the optical system for detecting the focus error signal and the temperature change around the system. Therefore, the offset of the focus error signal has to be corrected so that the maximum point of the track error signal coincides with the zero point of the focus error signal.

The correction of the offset is carried out in such a way that an offset voltage is applied to the focus error signal by an offset voltage applying means so that the focus error signal becomes zero at the point where the amplitude of the track error signal becomes maximum.

In the above mentioned offset correcting operation, the offset voltage to be applied to the focus error signal corresponding to the focus set point (zero cross point) is determined on the basis of the slope angle or inclination (gain) of the focus error signal at the zero point thereof under the assumption that the focus error signal is linear.

For example, under the assumption that the desired set point for the focal position of the track error signal corresponding to the maximum point of the track error signal waveform is positioned at a point dislocated from the zero point by a certain distance, the offset amount at the set point is determined from the assumptive linear line passing the zero point.

However, actually, the focus error signal is not necessarily linear. Therefore, if the offset amount based on the assumptive linear line is applied to the focus servo circuit, the focal position is dislocated from the set point. The amount of this dislocation increases according as the set point for the focal position is separated remote from the zero point. If the dislocation amount exceeds the allowable range for the focus error signal, the focus servo system becomes inoperative.

As a result, the offset voltage is limited within a small range so as not to make the servo system inoperative, which results in that the offset correction circuit can not cover the entire range of the set point of the focus offset.

Also, if a large amount of the offset voltage is applied to the focus servo system, since the focus error signal is not linear, that is the slope angle (gain) of the focus error signal is actually smaller than that of the assumptive linear line at the zero cross point, reliability of the servo control is impaired.

SUMMARY OF THE INVENTION

It is therefore an object of the present invention to provide a servo control system of an optical disk device in which the above mentioned problems are obviated.

The object of the invention can be achieved by a servo control system of an optical disk device comprising at least one of a focus servo control system and a tracking servo system for performing a feed-back control of a state of an optical spot which is converged on and irradiated to an optical disk, wherein the servo control system comprises: an optical detector for detecting at least one of a focus error and a tracking error, the detector being divided to at least two detection areas; a multiplexer for sharing time of a plurality of output signals transmitted from the detection areas of the optical detector; an adder for adding up the plurality of output signals from the detection areas of the optical detector to obtain a signal in response to an amount of reflection rays reflected from the optical disk or transmission rays; an A/D converter for converting an analogue time sharing signal output from the multiplexer to a digital signal by using an output signal from the adder as a reference input signal; and a logic circuit for obtaining a digital signal in response to the focus error or the tracking error by a calculation using the digital values corresponding to the plurality of the output signals transmitted from the detection areas of the optical detector through the A/D converter.

An advantage of the above mentioned servo control system is that the subtractive calculation can be deleted by arranging the multiplexer which performs the time sharing operation of the plurality of the output signals from the optical detector for the focus control or the tracking control at the time of converting the analogue signal to the digital signal by the A/D converter.

On the other hand, the adder adds up the plurality of the output signals from the optical detector. This added up signal is input to the A/D converter as the reference signal thereof.

In this state, the time sharing process is conducted to the plurality of the output signals from the detection areas of the optical detector. The output signals are input to the A/D converter to be converted to digital signals and after that the digital signals are transmitted to the logic circuit which calculates a focus error signal or a tracking error signal on the basis of the digital signals.

Therefore, it is another advantage of the present invention that the two systems, that is, the focus control system and the tracking control system can be controlled with the use of only one A/D converter.

Also, it becomes unnecessary to set a desired point of the object to be controlled at the center of the voltage between the positive reference signal and the negative reference signal for converting the analogue signals to the digital signals, which makes it possible to achieve a reliable AGC operation obviating the offset problems.

Further, in order to achieve the object of the invention mentioned before, there is provided a servo control system of an optical disk device comprising: a focus error signal generation circuit which is connected to a light receiving element for focussing control; a focussing offset voltage applying circuit which is connected to the focus error signal generation circuit; a gain changing circuit which is connected to the focussing offset voltage applying circuit; a focus servo circuit which is connected to the gain changing circuit; a track error signal generation circuit which is connected to a light receiving element for tracking control; a tracking servo circuit which is connected to the track error signal generation circuit; a focus offset correction control system, an input side thereof being connected to the track error signal generation circuit and an output side thereof being connected to the focus offset voltage applying circuit and the gain changing circuit; and a memory circuit for memorizing data for correcting the focus offset.

In accordance with the above mentioned structure, the amplitude of the track error signal obtained from the track error signal generation circuit is detected by the focus offset correction control system which transmits an offset signal the amount of which is memorized in advance in the focus offset correction data memory circuit to the focus offset voltage applying circuit so that the amplitude of the track error signal is maximized. The focus offset correction control system also transmits the gain of the focus error signal to the gain changing circuit so that the focus servo circuit receives a focus error signal in the state that the focus offset thereof is corrected.

An advantage of the above mentioned servo control system is that a stable and accurate offset correction of the focus error signal can be achieved due to the arrangement of the focus offset correction data memory circuit connected to the focus offset correction control system which makes it possible to determine the offset amount to be applied to the servo system at the time of correcting the offset of the focus error signal on the basis of the relation between the focus position and the focus error signal which is memorized in advance in the focus offset correction data memory circuit.

Also, due to the arrangement of the gain changing circuit disposed in the circuit of the focussing optical system which is an object of the offset correction control, it becomes possible to determine the gain of the gain changing circuit on the basis of the relation between the focus position and the focus error signal which is memorized in advance in the focus offset correction data memory circuit at the time of correcting the offset of the focus error signal.

Therefore, it is another advantage of the present invention that the gain of the focus error signal is always maintained constant irrespective of the corrected position of the focus error signal after the offset of the signal is corrected, which makes it possible to achieve a further stable and accurate focus offset correction of the error signal.

Further objects and advantages of the present invention will be apparent from the following description of the preferred embodiments of the invention as illustrated in the accompanying drawings.

BRIEF DESCRIPTION OF THE DRAWINGS

FIG. 5 is a graphical view of a waveform of a focus error signal; and

FIG. 6 is a graphical view representing the positional relation between the focus error signal and the track error signal.

DESCRIPTION OF THE PREFERRED EMBODIMENTS

Embodiments of the present invention are described hereinafter with reference to the drawings in comparison to the related art which is also explained with reference to the drawings.

Figure 2:
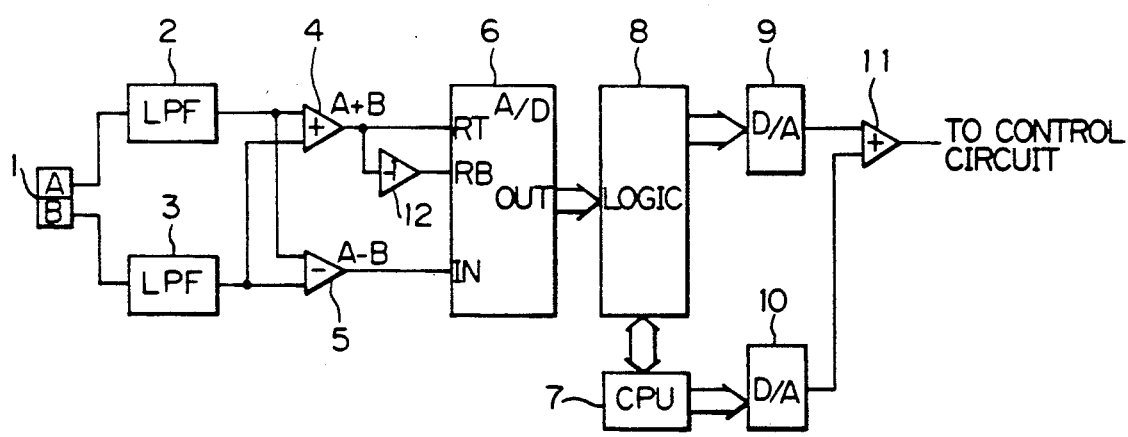
FIG. 2 is a block diagram of an example of the servo control system in accordance with the related art.

FIG. 2 illustrates an example of a servo control system of an optical disk device.

This example is aiming to realize a digitized intelligent servo system which constitutes a control system of the optical disk device.

With regard to one of the servo systems, for example, a focussing servo system, the construction of the system which is illustrated in FIG. 2 and the function thereof are as follows.

First, the reflection rays reflected from the optical disk (not shown) are received by a photoelectric detector 1 and converted to electric signals. The detector 1 is divided to at least two detection areas A and B. The outputs from the two detection portions A and B of the detector 1 are passed through low pass filters LPF 2 and LPF 3, respectively, and input to an adder 4 which adds the two output signals A and B to form an added up signal (A+B). Also, the two output signals A and B obtained from the two detection areas A and B of the detector 1 are input to a subtracter 5 after passing through the respective low pass filters LPF 2 and LPF 3. The subtracter 5 subtracts one of the signals B from the other A to form a difference signal (A−B) corresponding to the difference between the two signals. The difference signal is used as a focus error signal which corresponds to the amount of dislocation of the object to be controlled from a desired set point. In this case, in order to maintain the gain of the error signal constant irrespective of the change or fluctuation of the optical amount of the reflection rays from the optical disk, the difference signal (A−B) is converted to a digital signal by an A/D converter 6 using the added up signal (A+B) from the adder 4 as the reference input signal for the A/D converter 6. Thereby, the difference signal (A−B) is always normalized by the added up signal (A+B) corresponding to the optical amount of the reflection rays, which makes it possible to perform an AGC (Automatic Gain Control) function.

The error signal which was digitized by the A/D converter 6 is introduced to a logic circuit 8 which is controlled by a CPU 7. After that, the error signal is again converted to an analogue signal by a D/A converter 9. The analogue signal output from the D/A converter 9 is input to a focus servo control circuit which comprises a phase correction circuit and an objective lens driving circuit, so that a servo control loop is formed.

In the above mentioned structure, it is necessary to correct the offset of the error signal which offset means that the desired set point is shifted and dislocated from a reference point of the servo system caused by dimensional errors of the optical system or change of the ambient temperature. For this purpose, a corrective analogue signal derived from another D/A converter 10 which is also controlled by the CPU 7 is added to the analogue error signal obtained through the D/A converter 9 by another adder 11 so as to cancel the offset of the error signal.

It is to be noted that the low-pass filters LPF 2 and LPF 3 function to minimize the noise generated and transmitted backward from the A/D converter 6 at the time of sampling the signals.

Also, the logic circuit 8 functions to generate a timing signal for stopping the servo operation and an error discrimination signal.

The above mentioned circuit structure illustrated in FIG. 2 has to be prepared for every control system. For example, a focus control system comprises one special control circuit having the above mentioned structure for its own. Therefore, with regard to the focus/tracking control system, it is necessary to prepare another similar circuit for the tracking control system in addition to that for the focus control system, which makes the control system large and complicated as a whole.

Besides, in general, an A/D converter quantizes the potential difference between a positive reference input signal (RT) and a negative reference input signal (RB) to $2^n$ amount units wherein "n" designates the number of bits so as to digitize the input voltage of the corresponding signal.

On the other hand, the servo error signal (A−B) has a voltage of predetermined value (for example, zero) when the signal is coincident with the servo set point (desired point), that is when the beam spot is in focus on the desired track, for example. Also, when the signal value becomes discordant from the set point, the voltage of the signal becomes positive or negative according to the plus side or minus side of the signal with respect to the set point.

Therefore, when the error signal (A−B) is to be converted to a digital signal by an A/D converter, the set point of voltage is arranged as a center point of voltage between the positive reference voltage (RT) and the negative reference voltage (RB), that is, a point of (RT+RB)/2 so as to obtain a sufficient dynamic range. In this case, in order to perform a reliable AGC operation, when the added up signal (A+B) is input as the references (RT) and (RB), it is necessary to prevent the set point (RT+RB)/2 from being shifted and dislocated from the central point of the voltage along with the change of the references (RT) and (RB). Therefore, it is necessary to symmetrically change the references (RT) and (RB) with respect to each other relative to the central set point (RT+RB)/2. In other words, when a positive signal (A+B) is input to the reference (RT), a negative signal −(A+B) of the same value has to be input to the reference (RB). For this purpose, an inversion amplifier 12 of gain 1 is used to generate the signal having an inverted polarization, as illustrated in FIG. 2. In this case, if the inversion amplifier 12 has an offset or a gain error, the references (RT) and (RB) do not change symmetrically, which results in that the central set point of voltage for servo control of the error signal changes. It is possible to avoid such a problem by properly adjusting and correcting the offset and the gain of the amplifier 12. However, it is troublesome and costly to adjust and correct the amplifier.

An embodiment of the present invention described below obviates the problems mentioned above.

Figure 1:
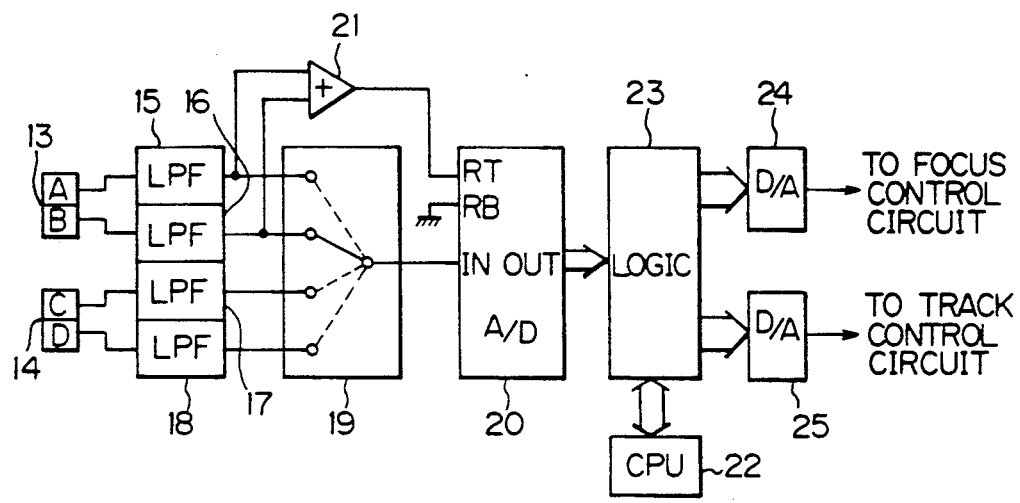
FIG. 1 is a block diagram of an embodiment of the servo control system in accordance with the present invention.

FIG. 1 illustrates the embodiment of the servo control system of an optical disk device of the present invention. The system comprises two optical detectors 13 and 14 each of which receives reflection rays reflected from an optical disk (not shown) and generates an electric signal corresponding to the luminous intensity of the detected reflection rays. The photoelectric detector 13 is divided to two detection areas A and B and arranged to detect the focus error of the device. Also, the photoelectric detector 14 is divided to two detection areas C and D and arranged to detect the tracking error of the device.

The output signals from the detection areas A, B, C and D of the detectors 13 and 14 are introduced to low-pass filters 15, 16, 17 and 18, respectively, and input to a multiplexer 19, after that. The multiplexer 19 functions to share the time of output signals transmitted from the detection areas A, B, C and D, respectively.

The output side of the multiplexer 19 is connected to an A/D converter 20.

On the other hand, the output signals transmitted from the detection areas A and B of the detector 13 are added together by an adder 21 after passing through the low-pass filters 15 and 16, respectively. The added up signal (A+B) obtained by the adder 21 is input to the A/D converter 20 as a positive reference signal (RT).

On the other hand, the negative reference signal (RB) of the A/D converter 20 is arranged as zero, that is, the desired set point of voltage to be controlled. It is easy to arrange the reference voltage (RB) to be zero by setting the voltage as the ground level which is the basic reference level of the whole system.

Figure 3:
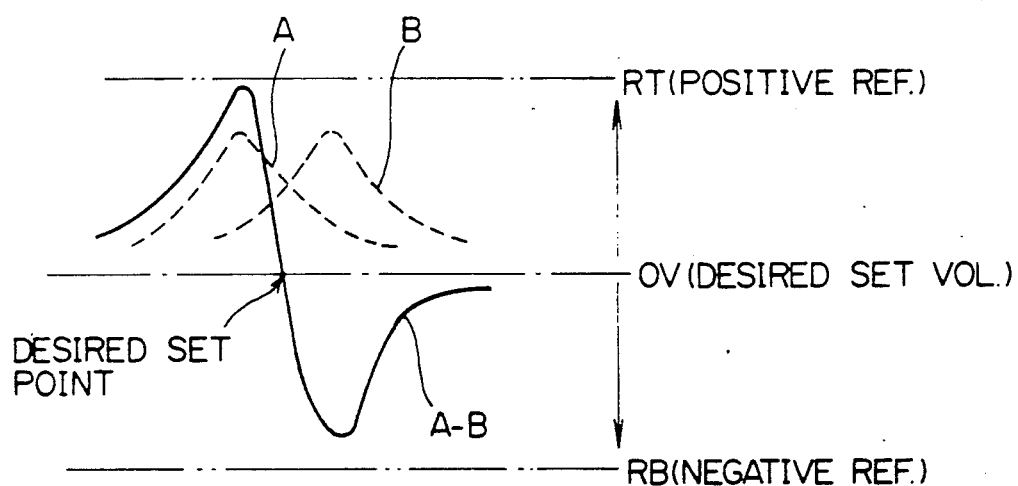
FIG. 3 is an explanatory view of the control signals of the system relating to the present invention.

The arrangement of the reference signal (RB) to be set as zero is further described below with reference to FIG. 3.

Each output signal obtained from the detector 13 before used in a calculation process is either positive or negative. The particular example of FIG. 3 represents a case wherein the signals A and B are positive. In this case, it is necessary to conduct the A/D converting operation only for the positive side of the signals with respect to the set point of zero. Therefore, it becomes unnecessary to set a central voltage as the related art mentioned before, which makes it possible to use only the positive reference signal (RT) while fixing the reference (RB) as RB=0. In accordance with the above mentioned arrangement wherein the added up signal (A+B) for focus control is used as the reference signal of the A/D converter 20, the digital signal output from the A/D converter 20 become stable irrespective of the fluctuation of the intensity of the reflection rays from the optical disk, which increases the reliability of the AGC function of the control system.

The digital signal output from the A/D converter 20 is input to a logic circuit 23 which is controlled by a CPU 22 and performs a predetermined calculation in response to the signal. More precisely, the signal is separated synchronously with the timing shared by the multiplexer 19 to form signals which are in the state before being treated by the time sharing operation and used for the calculation to obtain the respective difference signals (A−B) and (C−D) for the focus control and the tracking control, respectively.

After that, as in the case of FIG. 2, the offset correction data memorized in the circuit is added to the calculation result in the circuit 23. The digital signal output from the logic circuit 23 is reconverted to analigue signals by D/A converters 24 and 25, respectively, which transmit a focus error signal and a tracking error signal to the focus control circuit and the tracking control circuit, respectively.

It is to be noted that the phase correction circuit of each control circuit may be digitized so that the digital signals output from the logic circuit are transmitted to the focus and tracking control circuits instead of the above mentioned arrangement wherein the digital signals output from the logic circuit are reconverted to the analogue signals and transmitted to the phase correction circuit as the analogue error signals.

Also, in the above mentioned embodiment, the added up signal (A+B) is used as the reference input signal of the A/D converter 20. However, it is possible to use a gain correction means known per se instead disposed in the line of the signal output from the photoelectric detector 14, to avoid the degradation of the AGC function for the tracking signal due to the difference of the photoelectric sensitivity between the detector 13 for the focus control and the detector 14 for the tracking control.

Further, it is possible to use one photoelectric detector which is divided to four detection areas to be commonly used for focussing and tracking control systems instead of preparing two individual detectors 13 and 14 for focussing and tracking control systems, respectively, as in the case of the above mentioned embodiment.

As mentioned above, in accordance with the present invention, the multiplexer is arranged in such a way that the plurality of signals output from the detection areas of the photoelectric detector for focussing or tracking control system are input to the A/D converter after the time sharing process by the multiplexer without conducting a subtractive calculation, that the plurality of the signals output from the detector are added together by an adder to form a reference signal of the A/D converter which converts the analogue signals output from the detectors to digital signals and that the digital signals output from the A/D converter is transmitted to a logic circuit which calculates a focus error signal and/or a tracking error signal in a digitized state in response to the signals output from the A/D converter. Therefore, one A/D converter can be commonly used for controlling the focus and the track of the optical disk device, which makes it possible to simplify the control system.

Also, it becomes unnecessary to set a central point of voltage between the positive and negative reference voltages to be input to the A/D converter, which makes it possible to dispense with the inversion amplifier which often causes the offset of the control system. Therefore, a reliable AGC function can be achieved.

A focus offset correction circuit of the optical pickup device in accordance with the present invention is described hereinafter.

FIG. 6 is a graphical view of error signals used for servo control of the optical pickup device. Line (a) represents a waveform of a focus error signal Fo in the coordinates wherein the abscissa represents the distance between the objective lens and the optical disk surface setting the point where the focus error signal Fo is zero as the reference point (A) and the ordinate represents the amplitude of the signal Fo.

Most desirably, when the focus error signal Fo is zero, the beam is focussed on the disk surface so that the beam spot diameter is minimized thereon and that the amplitude of the track error signal Tr (or information signal) which is used for tracking servo control is maximized, as represented by line (b) in FIG. 6.

However, in actual cases, the maximum point P of the track error signal Tr does not necessarily coincide with the zero point of the focus error signal Fo due to the constructional errors of the optical system for detecting the focus error signal and the temperature change around the system, as represented by line (c) in FIG. 6. Therefore, the offset of the focus error signal Fo has to be corrected so that the maximum point P of the track error signal Tr coincides with the zero point of the focus error signal Fo.

The correction of the offset is carried out in such a way that an offset voltage is applied to the focus error signal Fo by an offset voltage applying means so that the focus error signal Fo becomes zero at the point where the amplitude of the track error signal Tr becomes maximum.

In the above mentioned offset correcting operation, the offset voltage to be applied to the focus error signal Fo corresponding to the focus set point A (zero cross point) is determined on the basis of the slope angle or inclination (gain) of the focus error signal Fo at the zero point thereof under the assumption that the focus error signal Fo is linear as represented by a linear line 101 in FIG. 5.

For example, in FIG. 5, under the assumption that the desired set point A for the focal position of the track error signal corresponding to the maximum point P of the track error signal waveform is positioned at a point dislocated from the zero point by $+1$ $\mu$m, the offset amount Fa at the set point A is determined from the assumptive linear line 101 passing the zero point.

However, actually, the focus error signal Fo is not necessarily linear but curved as illustrated in FIG. 5. Therefore, if the offset amount Fa based on the assumptive linear line 101 is applied to the focus servo circuit, the desired set point corresponding to the actual focal position is shifted and dislocated from the set point of $+1$ $\mu$m away from the zero point to a further remote point from the zero point. The amount of this dislocation increases according as the set point A for the focal position is separated remote from the zero point. If the dislocation amount exceeds the allowable range for the focus error signal Fo, the focus servo system becomes inoperative.

As a result, the offset voltge is limited within a small range so as not to make the servo system inoperative, which results in that the offset correction circuit can not cover the entire range of the set point of the focus offset.

Also, if a large amount of the offset voltage is applied to the focus servo system, reliability of the servo control is impaired, since the focus error signal Fo is actually not linear, that is the slope angle (gain) of the focus error signal Fo is actually smaller than that of the assumptive linear line 101 at the zero point.

The above mentioned problems can be obviated by an embodiment of the present invention described hereinafter with reference to FIGS. 4 and 5.

Figure 4:
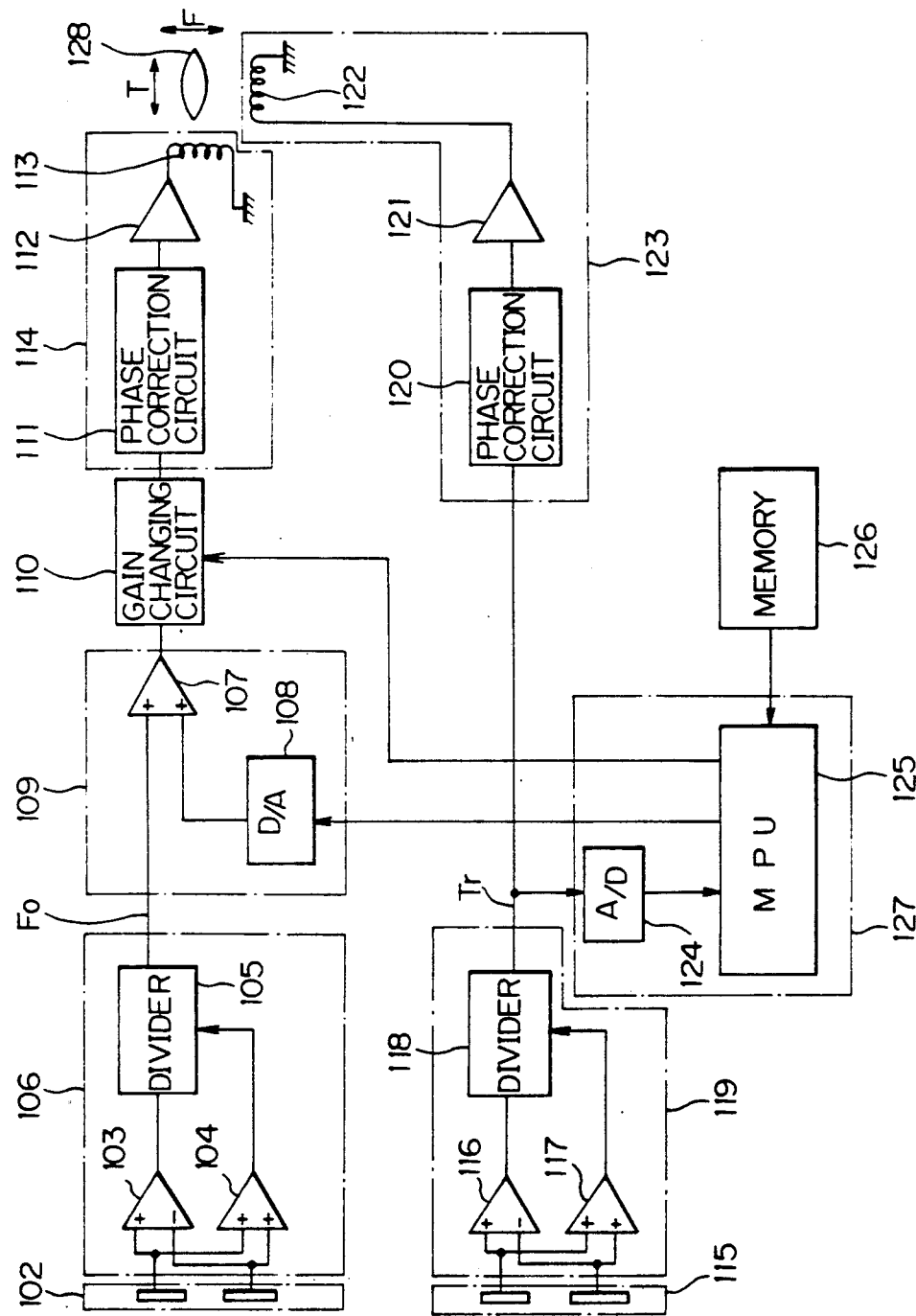
FIG. 4 is a block diagram of another embodiment of the servo control system in accordance with the present invention.

The whole structure of the focus offset correction circuit of an optical pickup device is illustrated in FIG. 4. The structure comprises two light receiving elements (photoelectric detectors) 102 for focus control of the pickup device. The elements 102 are connected to a difference amplifier 103 and an adder amplifier 104, respectively. The output side of each of the amplifiers 103 and 104 is connected to a divider 105. The amplifiers 103 and 104 and the divider 105 constitute a focus error signal generation circuit 106.

The divider 105 is connected to one of input terminals of an adder amplifier 107. A D/A converter 108 is connected to the other of the input terminals of the amplifier 107. The amplifier 107 and the D/A converter 108 constitute a focus offset applying circuit 109.

The adder amplifier 107 is connected to a gain changing circuit (variable gain circuit) 110 which is connected to a phase correction circuit 111. The circuit 111 is connected to an objective lens driving circuit 113 through a power amplifier 112. The circuit 111, the amplifier 112 and the circuit 113 constitute a focus servo circuit 114.

Also, the embodiment comprises two light receiving elements (photoelectric detectors) 115 for track control. The elements 115 are connected to a difference amplifier 116 and an adder amplifier 117, respectively. The output side of each of the amplifiers 116 and 117 is connected to a divider 118. The amplifiers 116 and 117 and the divider 118 constitute a track error signal generation circuit 119.

The divider 118 is connected to a phase correction circuit 120 which is connected to an objective lens driving circuit 122 through a power amplifier 121. The circuit 120, the amplifier 121 and the circuit 122 constitute a tracking servo circuit 123.

Also, the divider 118 is connected to an MPU 125 through an A/D converter 124. A memory 126 which memorizes data for correcting the focus offset is connected to the MPU 125. The output side of the MPU 125 is connected to the D/A converter 108 and the gain changing circuit 110, respectively. The converter 124 and the MPU 125 constitute a focus offset correction control means 127.

The control system having the above mentioned construction functions as follows.

The reflection rays reflected from the optical disk are detected by the light receiving elements 102. The detection signals output from the elements 102 are introduced to the amplifier 103 which generates a difference signal in response to the difference between the detection signals transmitted from the two elements 102. Also, the two detection signals are introduced to the amplifier 104 which generates an added up signal in response to the sum of the two detection signals which corresponds to the luminous amount of the reflection rays. The value of the difference signal is divided by the value of the added up signal to normalize the detection signals. By this normalization, it becomes possible to obtain a focus error signal Fo having a constant gain irrespective of change of the optical amount of the reflection rays caused by fluctuation of the reflectivity of the optical disk.

The focus error signal Fo output from the divider 105 is input to the adder amplifier 107 in which the signal Fo and the offset voltage transmitted from the MPU 125 through the D/A converter 108 are added up together. The gain of the added up signal output from the amplifier 107 is changed by the circuit 110.

After the focus offset of the focus error signal Fo is corrected in the above mentioned way, the signal Fo is transmitted through the phase correction circuit 111 and the power amplifier 112 to the servo driving circuit 113. The circuit 113 drives the objective lens 128 in the focus direction F to adjust the focus of the lens in response to the focus error signal Fo.

On the other hand, the detection signals output from the light receiving elements 115 for controlling the tracking position of the disk are transmitted to the amplifiers 116 and 117, respectively, each of which transmits an output signal to the divider 118 so that the detection signals are normalized in the same way as the focus control system, mentioned above. In this way, the offset of the track error signal Tr is corrected. After that, the track error signal Tr is transmitted through the phase correction circuit 120 and the power amplifier 121 to the objective lens driving circuit 122. The circuit 122 drives the lens 128 in the tracking direction T to adjust the tracking position of the lens with respect to the optical disk.

In the above mentioned function of the servo control system, the track error signal Tr is transmitted to the MPU 125 through the A/D converter 124 to correct the focus offset in such a way mentioned as follows.

The MPU 125 detects the amplitude of the track error signal Tr. After that, the focus offset is corrected in such a way that the position of the maximum point P of the track error signal Tr coincides with the desired set point A of the focus error signal Fo. In this case, in accordance with the embodiment of the present invention, the memory 126 memorizes in advance the relation between the focus position X, the focus error signal F(X) and the gain G(X) of the focus error signal so that an offset amount in response to the position of the desered set point A can be transmitted to the D/A converter 108 which outputs the offset signal to the amplifier 107 to correct the offset of the focus error signal.

Further, the reciprocal 1/G(X) of the gain G(X) is input to the gain changing circuit 110 so that the gain G(X) of the focus error signal after passing through the circuit 110 is always maintained constant irrespective of the position of the focus point to be adjusted.

Examples of the focus offset correction function are described below with reference to the following tables-1 and 2.

TABLE 1

| X μm | F (X) | G (X) |
|------|-------|-------|
| 2.0  | 14.5  | 0.5   |
| 1.9  | 14.0  | 0.5   |
| 1.8  | 13.5  | 0.5   |
| 1.7  | 13.0  | 0.5   |
| 1.6  | 12.4  | 0.6   |
| 1.5  | 11.8  | 0.6   |
| —    | —     | —     |
| 0.1  | 1.0   | 1.0   |
| 0    | 0     | 1.0   |
| −0.1 | −1.0  | 1.0   |
| —    | —     | —     |
| −1.9 | −14.0 | 0.5   |
| −2.0 | −14.5 | 0.5   |

TABLE 2

| 1/G (X) |
|---------|
| 2.0     |
| 2.0     |
| 2.0     |
| 2.0     |
| 1.67    |
| 1.67    |
| —       |
| 1.0     |
| 1.0     |
| 1.0     |
| —       |
| 2.0     |
| 2.0     |

Table-1 represents data of the relation between the focus position X, the focus error signal F(X) and the focus error signal gain G(X). The table is made on the basis of the result of measurement of the data at the time of fabricating the optical pickup device. The data is memorized in the memory 126.

If the desired set point A is to be shifted by X= +2 μm, the MPU 125 transmits a signal having a value of 14.5 to the D/A converter 108. From this signal, it is discriminated that the focus error signal gain G(X) is 0.5 so that the gain of the gain changing circuit (variable gain circuit) 110 can be determined as 2.0 from Table-2. Thereby, it becomes possible to perform a stable and accurate focus offset correction operation.

The above mentioned example is based on the assumption that the gain of the focus error signal Fo is 1.0 at around the zero point thereof and the gain of the gain changing circuit (variable gain circuit) 110 is 1.0 for the gain 1.0 of the error signal Fo. However, the values of gain are not limited to those of the example but can be determined depending to the structure of the optical pickup device and the servo control system thereof.

It is to be noted that the amplitude of the information signal waveform (RF signal) may be read and used instead of the track error signal Tr read from the A/D converter 124 as is the case of FIG. 4.

Also, in Table-1, it is possible to arrange the control system in such a way that the memory 126 memorizes only the focus position X and the focus error signal F(X) and that the gain is calculated by the MPU 125 instead of memorizing all the data of the focus position X, the focus error signal F(X) and the focus error signal gain G(X) as in the case of the above mentioned embodiment.

Further, it is possible to memorize the data of gain to be input to the gain changing circuit 110 in the memory 126 so that the gain can be obtained directly from the memorized data instead of calculating the date by the MPU 125.

Many widely different embodiments of the present invention may be constructed without departing from the spirit and scope of the present invention. It should be understood that the present invention is not limited to the specific embodiments described in the specification, except as defined in the appended claims.

What is claimed is:

1. A servo control system for an optical disk device comprising:
    a focussing light receiving means for focus control of said optical disk device:
    a focus error signal generation circuit which is connected to said focussing light receiving means and outputs a focus error signal;
    a focus offset applying circuit which is connected to said focus error signal generation circuit;
    a gain changing circuit which is connected to said focus offset applying circuit;
    a focus servo circuit which is connected to said gain changing circuit;
    a tracking light receiving means for track control of said optical disk device;
    a track error signal generation circuit which is connected to said tracking light receiving means and outputs a track error signal;
    a track servo circuit which is connected to said track error signal generation circuit;
    a focus offset correction means which has an input side connected to said track error signal generation circuit and an output side connected to said focus offset applying circuit and said gain changing circuit; and
    a memory means which is connected to said focus offset correction means and memorizes data for correcting said focus offset.

2. A servo control system for an optical disk device according to claim 1, wherein said focussing light receiving means comprises two photoelectric detectors.

3. A servo control system for an optical disk device according to claim 2, wherein said focus error signal generation circuit comprises:
    a difference amplifier to which said two detectors are connected,
    an adder amplifier to which said two detectors are also connected; and
    a divider to which said difference amplifier and said adder amplifier are connected.

4. A servo control system for an optical disk device according to claim 3, wherein said focus offset applying circuit comprises:
    a D/A converter which is connected to an MPU; and
    an adder amplifier which has an input side to which said divider and said D/A converter are connected and an output side which is connected to said gain changing circuit.

5. A servo control system for an optical disk device according to claim 4, wherein said focus servo circuit comprises:
    a phase correction circuit to which said gain changing circuit is connected;
    a power amplifier to which said phase correction circuit is connected; and
    a drive circuit to which said power amplifier is connected for driving an objective lens to be controlled in a focussing direction.

6. A servo control system for an optical disk device according to claim 5, wherein said tracking light receiving means comprises two photoelectric detectors.

7. A servo control system for an optical disk device according to claim 6, wherein said track error signal generation circuit comprises:
    a difference amplifier to which said two photoelectric detectors are connected;
    an adder amplifier to which said two photoelectric detectors are also connected; and
    a divider to which said difference amplifier and said adder amplifier are connected.

8. A servo control system for an optical disk device according to claim 7, wherein said track servo means comprises:
    a phase correction circuit to which said divider of said track error signal generation circuit is connected;
    a power amplifier to which said phase correction circuit of said track servo means is connected; and
    a driver circuit to which said power amplifier of said track servo means is connected for driving said objective lens in a tracking direction.

9. A servo control system for an optical disk device according to claim 8, wherein said focus offset correction means comprises:
    an MPU having an output side which is connected to said D/A converter of said focus offset applying circuit; and
    an A/D converter having an input side to which said divider of said track error signal generation circuit is connected and an output side which is connected to an input side of said MPU.

* * * * *